United States Patent
Song et al.

(10) Patent No.: US 11,196,112 B2
(45) Date of Patent: Dec. 7, 2021

(54) CYLINDRICAL SECONDARY BATTERY INSULATION MEMBER

(71) Applicant: LG Chem, Ltd., Seoul (KR)

(72) Inventors: Han Gab Song, Daejeon (KR); Kyung Min Kim, Daejeon (KR); Min Gyu Kim, Gyeonggi-do (KR); Pil Kyu Park, Daejeon (KR)

(73) Assignee: LG Chem, Ltd.

( * ) Notice: Subject to any disclaimer, the term of this patent is extended or adjusted under 35 U.S.C. 154(b) by 246 days.

(21) Appl. No.: 16/322,017

(22) PCT Filed: Jan. 25, 2018

(86) PCT No.: PCT/KR2018/001108
§ 371 (c)(1),
(2) Date: Jan. 30, 2019

(87) PCT Pub. No.: WO2018/147578
PCT Pub. Date: Aug. 16, 2018

(65) Prior Publication Data
US 2019/0173060 A1    Jun. 6, 2019

(30) Foreign Application Priority Data
Feb. 13, 2017   (KR) .................. 10-2017-0019123

(51) Int. Cl.
*H01M 50/116*    (2021.01)
*H01M 10/04*     (2006.01)
(Continued)

(52) U.S. Cl.
CPC ..... *H01M 50/116* (2021.01); *H01M 10/0422* (2013.01); *H01M 10/0431* (2013.01);
(Continued)

(58) Field of Classification Search
CPC .......... H01M 2/0277; H01M 10/0422; H01M 50/107; H01M 50/184; H01M 50/136;
(Continued)

(56) References Cited

U.S. PATENT DOCUMENTS 5,462,820 A    10/1995  Tanaka
5,654,114 A *   8/1997  Kubota ................. H01M 4/485
                                           429/338
(Continued)

FOREIGN PATENT DOCUMENTS

JP    H04357665 A    12/1992
JP    H07130341 A     5/1995
(Continued)

OTHER PUBLICATIONS

International Search Report for Application No. PCT/KR2018/001108 dated May 14, 2018.
(Continued)

*Primary Examiner* — Jonathan G Jelsma
(74) *Attorney, Agent, or Firm* — Lerner, David, Littenberg, Krumholz & Mentlik, LLP

(57) ABSTRACT

The present disclosure provides an insulation member having excellent mechanical properties having enough shock-absorbing effect in external shock and volume change in a battery and provides a cylindrical secondary battery including the insulation member. The insulation member according to the present disclosure has excellent mechanical properties in high temperature, is composed of polypropylene having narrow molecular weight, and has a fine pattern on the surface.

5 Claims, 1 Drawing Sheet

(51) Int. Cl.
*H01M 10/0587* (2010.01)
*H01M 50/107* (2021.01)
*H01M 50/411* (2021.01)
*H01M 50/184* (2021.01)
*H01M 10/052* (2010.01)

(52) U.S. Cl.
CPC ..... *H01M 10/0587* (2013.01); *H01M 50/107* (2021.01); *H01M 50/184* (2021.01); *H01M 50/411* (2021.01); *H01M 10/052* (2013.01)

(58) Field of Classification Search
CPC . H01M 50/131; H01M 50/121; H01M 50/116
See application file for complete search history.

(56) References Cited

U.S. PATENT DOCUMENTS

| | | | |
|---|---|---|---|
| 6,455,659 | B1 | 9/2002 | Kuramoto et al. |
| 2006/0073380 | A1 | 4/2006 | Kim et al. |
| 2006/0115722 | A1 | 6/2006 | Kim |
| 2007/0154789 | A1 | 7/2007 | Chang et al. |
| 2013/0183556 | A1 | 7/2013 | Kim |
| 2013/0244090 | A1 | 9/2013 | Tanaka et al. |
| 2013/0252055 | A1 | 9/2013 | Kim et al. |
| 2013/0273401 | A1 | 10/2013 | Lee et al. |
| 2014/0065471 | A1 | 3/2014 | Kim |
| 2014/0162102 | A1 | 6/2014 | Kim et al. |
| 2014/0186670 | A1 | 7/2014 | Kim et al. |
| 2014/0220394 | A1 | 8/2014 | Kim et al. |
| 2014/0305500 | A1 | 10/2014 | Zhu et al. |
| 2016/0028058 | A1 | 1/2016 | Kim et al. |
| 2017/0084947 | A1 | 3/2017 | Kakinuma et al. |
| 2017/0313867 | A1* | 11/2017 | Lampela ................ C08L 23/14 |

FOREIGN PATENT DOCUMENTS

| | | | |
|---|---|---|---|
| JP | 4414506 | B2 | 2/2010 |
| JP | 2014523067 | A | 9/2014 |
| JP | 2014523610 | A | 9/2014 |
| JP | 5767407 | B2 | 8/2015 |
| JP | 6139194 | B2 | 5/2017 |
| KR | 20060060807 | A | 6/2006 |
| KR | 100614390 | B1 | 8/2006 |
| KR | 100768705 | B1 | 10/2007 |
| KR | 20080030702 | A | 4/2008 |
| KR | 101066022 | B1 | 9/2011 |
| KR | 20120066916 | A | 6/2012 |
| KR | 20130004075 | A | 1/2013 |
| KR | 20130033551 | A | 4/2013 |
| KR | 20130084086 | A | 7/2013 |
| KR | 101300585 | B1 | 8/2013 |
| KR | 20140017743 | A | 2/2014 |
| KR | 20140028329 | A | 3/2014 |
| KR | 20160012955 | A | 2/2016 |
| KR | 20160014124 | A | 2/2016 |
| KR | 20160029230 | A | 3/2016 |
| WO | 2016013149 | A1 | 1/2016 |

OTHER PUBLICATIONS

Extended European Search Report for Application No. EP18751901 dated Jun. 6, 2019.

\* cited by examiner

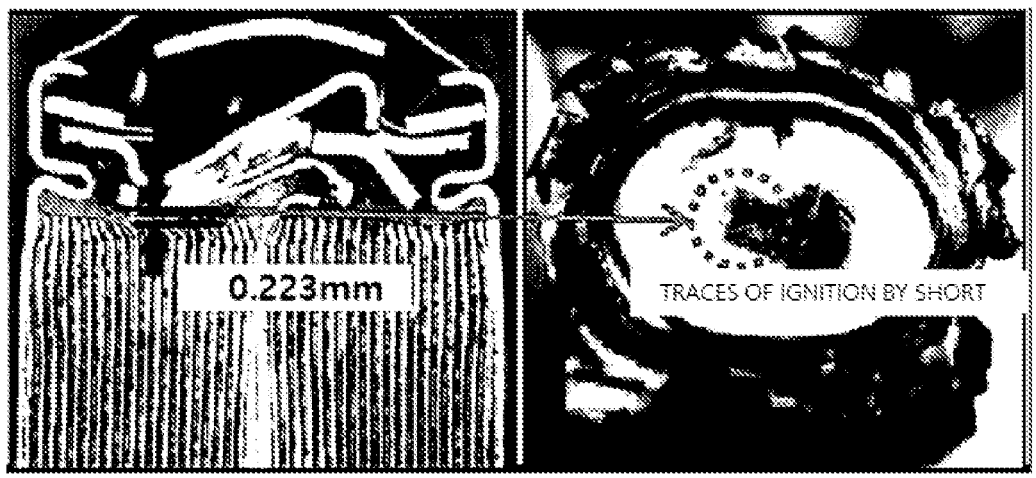

CYLINDRICAL SECONDARY BATTERY INSULATION MEMBER

CROSS-REFERENCE TO RELATED APPLICATIONS

This application is a national phase entry under 35 U.S.C. § 371 of International Application No. PCT/KR2018/001108, filed Jan. 25, 2018, which claims priority to Korean Patent Application No. 10-2017-0019123, filed Feb. 13, 2017, the disclosures of which are incorporated herein by reference.

TECHNICAL FIELD

The present disclosure relates to a cylindrical secondary battery insulation member. More particularly, the present disclosure relates to prevent short circuit and increase stability by strengthening mechanical properties of the insulation member between a top cap assembly of the cylindrical secondary battery and an electrode assembly and realize enough shock-absorbing effect of external shock and volume change in a battery.

BACKGROUND ART

Generally, a secondary battery is different from a primary batter which is impossible of charging. A secondary battery is possible of charge and discharge and widely used in electronic products such as cell phones, notebook computers, camcorders or a power supply of electric vehicles, etc. Especially, a lithium secondary battery has operating voltage of 3.6V, has approximately 3 times capacity compared to a nickel-cadmium battery or a nickel-hydrogen battery which is widely used as a power supply of electrical equipment, and has high energy density per unit weight, thereby lithium secondary batteries' utilization is dramatically increasing.

The lithium secondary battery mainly uses lithium-based oxide and carbon each as a positive electrode active material and a negative electrode active material. In addition, the lithium secondary battery can be classified as a prismatic type battery, a cylinder type battery, and a pouch type battery.

A lithium secondary battery provides an electrode assembly which sequentially arranged a positive electrode, a separator, and a negative electrode and an exterior material which sealed and stored an electrode assembly and electrolyte together. Especially, an exterior material of a prismatic type or a cylinder type secondary battery provides a cylindrical can formed an open ended and a cap assembly sealed and combined to an open ended of a cylindrical can.

An electrode assembly is classified as a jelly-roll type which interposed a separator between a positive electrode and a negative electrode each in sheet form applied active material and wound up and a stacked type which interposed a separator between a plurality of positive electrode and a plurality of negative electrode in predetermined size and sequentially laminated. Wherein, a jelly-roll type electrode assembly is easily manufactured and has high energy density per unit, and especially a cylindrical can of a cylinder type or prismatic type battery can be easily stored, thereby a jelly-roll type electrode assembly is widely used. Meanwhile, a staked type electrode assembly is widely used in a pouch type battery.

However, when charge and discharge of a secondary battery, an electrode assembly goes through repeated expansion and contraction and tends to transform, and in this process, in the case of a jelly-roll type electrode assembly, stress is concentrated on the center, an electrode pierces a separator and contacts to a metal center pin and tends to generate inner short circuit. The inner short circuit is connected because of heat of a battery and organic solvent is decomposed and generates gas, and by increasing pressure of inside of a battery, an exterior material can be ruptured. Increase in gas voltage of inside of a battery can be generated by short circuit because of external shock.

In order to solve the problem described above, a secondary battery basically provides a safety element. Especially, a cylinder type battery has safety device such as a seat belt discharging high-pressure gas and a Current Interrupt Device (CID) which blocks current when internal pressure of a battery increases. Also, a cylinder type battery provides a cap assembly comprising a top cap formed a projecting terminal which protects such safety device.

An electrode assembly upper side is equipped with an insulation member in plate type structure and gas can be discharged, and to connect a positive electrode tab of an electrode assembly and a cap plate of a cap assembly, in the center an opening is formed to connect to a penetrating hole of a center pin.

Generally, an insulation member used in a cylindrical battery is composed of a non-woven fabric, in the case of the non-woven fabric, it is a material which can be combust in high temperature so when short is occurred in external shock, insulation member of a non-woven fabric is combusted and short is expanded and danger of explosion of a battery is increased. Also, in the case of a non-woven fabric, possibility of damage and transform of shape in high temperature is high, and mechanical properties is low, and when a battery cylindrical can is expanded by increasing inner pressure of a battery by vaporizing low boiling point solvent among electrolyte, it causes leak in electrolyte and increase in inner resistance because of inflow of air and moisture from outside, thereby a battery feature can be deteriorated.

In order to solve the problem described above, organic electrical material of an insulation member having high mechanical properties and heat resistance which can melt and flow even though it is higher than the melting point which doesn't burn in high temperature and prevent expansion of short is demanded to be developed.

DISCLOSURE

Technical Problem

The present disclosure is provided to solve the above technical problems of the related art.

The present disclosure provides to prevent short circuit and increase stability by strengthening mechanical properties of an insulation member between a top cap assembly of a cylindrical secondary battery and an electrode assembly and realize enough shock-absorbing effect of external shock and volume change in a battery.

Technical Solution

According to one exemplary embodiment of the present disclosure, in a secondary battery in which a jelly-roll having a positive electrode, a negative electrode, and a separator disposed between the positive electrode and the negative electrode is mounted in a cylindrical battery case, an insulation member of the present disclosure is disposed on an upper end of the jelly-roll and made of polypropylene, and the polypropylene has a tensile strength of from 20 to 30 MPa and a flexural modulus of from 1500 to 1650 MPa at 100° C.

According to another exemplary embodiment of the present disclosure, the polypropylene may have an intrinsic viscosity of from 0.6 to 1.2 dl/g and an Mw/Mn value of from 1.5 to 2.5.

According to still another exemplary embodiment of the present disclosure, the insulation member may have a fine pattern.

According to yet another exemplary embodiment of the present disclosure, a shape of the pattern may have a mesh shape, a lamellar shape, an embo shape, a linear shape, a circular shape, an elliptical shape, a polygonal shape, or a waveform shape.

According to still yet another exemplary embodiment of the present disclosure, the pattern may be formed by printing a pattern using a silicon master mold.

According to still yet another exemplary embodiment of the present disclosure, there is provided a cylindrical secondary battery having the insulation member.

Advantageous Effects

According to the exemplary embodiment of the present disclosure, it provides an insulation member having excellent mechanical properties having enough shock-absorbing effect in external shock and volume change in a battery and provides a cylindrical secondary battery comprising the insulation member.

BRIEF DESCRIPTION OF THE DRAWINGS

FIGURE is a drawing of compression test result of a secondary battery having an insulation member according to an exemplary embodiment of the present disclosure.

DETAILED DESCRIPTION OF THE PREFERRED EMBODIMENTS

Hereinafter, embodiments of the present disclosure will be described in detail. However, the description provided herein is for better understanding of the present disclosure, and the scope of the present disclosure is not limited thereto.

In a secondary battery in which a jelly-roll having a positive electrode, a negative electrode, and a separator disposed between the positive electrode and the negative electrode is mounted on a cylindrical battery case, an insulation member according to one embodiment of the present disclosure is disposed in an upper end of the jelly-roll and made of polypropylene.

The polypropylene is obtained by polymerizing propylene in a liquid phase at a pressure of 1 to 40 atm and at a temperature of from 20 to 120° C. (specifically from 50 to 100° C.) using a complex catalyst of triethylaluminum and titanium chloride (III) in a saturated hydrocarbon solvent such as heptane, removing the catalyst by decomposing with water and extracting a solvent to obtain a polymer.

Although a composition ratio of a crystalline portion and a non-crystalline portion of the polypropylene obtained according to a catalyst system and other reaction conditions to be used is different, a content of an isotactic polymer when using a Natta catalyst is generally higher than that in the case of using a Ziegler catalyst. The polypropylene is crosslinked by radiation action in an absence of air. A structure of polypropylene fiber obtained by melt spinning varies depending on heat treatment and stretching conditions, but usually belongs to a monoclinic system having a three-fold helical structure, and has a unit cell of a 20.95, b 6.56, c 6.50 Å (fiber period). The polypropylene fiber has a specific gravity of 0.91 and is lightweight, and with a dry and wet strength of from 5 to 7 g/d, strength of the polypropylene fiber is not lowered in water.

The polypropylene fiber has a dry and wet elongation of from 15 to 25%, a Young's modulus of 50 to 65 g/d, and an instantaneous elastic recovery of from 35% at 5% elongation. The polypropylene fiber shrinks by 2.5% (the same as Tetoron) when stored in air at 130° C. for 30 minutes, resists strong acids and weak alkalis, and usually does not dissolve in solvents but dissolves in decalin, tetralin, or the like at high temperatures. Resistance to sunlight is not good and dyeability is still not enough. Spun dyed fibers or modified fibers are colored with acid mordant dyes, acid dyes, or metal complex dyes.

In regard of a secondary battery, regarding a polymer resin formed an insulation member, with insulation property and elasticity, in severe condition of high temperature and high moisture in a battery, to maintain hermeticity, mechanical properties such as high heat resistance, shock resistance, and durability, and chemical resistance of electrolyte are demanded. In the case of an insulation member which is composed of a polymer resin material with conventional non-woven fabric material, it has advantages such as mass production and low cost, but mechanical properties such as shock resistance and durability are low so it can be easily deformed in external shock and has danger of short circuit, and in the case of short circuit, a non-woven fabric is combusted and short part is expended, and pressure in a battery is increased.

According to an exemplary embodiment of the present disclosure, the cylindrical battery adopts polypropylene material reinforced with mechanical properties such as shock resistance and durability that are required in the insulation member, thereby satisfying properties required in the insulation member, specifically intrinsic viscosity, molecular weight, tensile strength in high temperature, and flexural modulus, and thus it is stronger in external shock and reduces stability degradation of a cylindrical battery by volume change in a battery.

Specifically, the polypropylene of the insulation member according to one embodiment of the present disclosure has a tensile strength of from 20 to 30 MPa and a flexural modulus of from 1500 to 1650 MPa at 100° C.

When the tensile strength is less than 20 MPa and the flexural modulus is less than 1500 MPa at 100° C., safety during application of an external shock is not ensured, and when the tensile strength exceeds 30 MPa and the flexural modulus exceeds 1650 MPa at 100° C., it is difficult to be realized as polypropylene, which is not preferable.

In the present disclosure, the tensile strength may be measured according to ASTM-D638, and the flexural modulus may be measured according to ASTM D790.

The polypropylene of the insulation member according to one embodiment of the present disclosure has an intrinsic viscosity of from 0.6 to 1.2 dl/g and an Mw/Mn value of from 1.5 to 2.5.

When the intrinsic viscosity is less than 0.6 and the Mw/Mn value is less than 1.5, strength as the insulation member may not be ensured, and when the intrinsic viscosity is more than 1.2 and the Mw/Mn value is more than 2.5, moldability is deteriorated and thus processing into the insulation member may be difficult, which is not preferable.

Polypropylene satisfying the above described physical properties may be obtained by stretching and heat treatment.

The stretching improves an orientation of a unit molecule, and the heat treatment improves heat resistance and strength. Accordingly, the above described intrinsic viscosity, Mw/Mn value, tensile strength, and flexural modulus are satisfied. A stretching ratio is preferably 0 to 4%, and a heat treatment is preferably performed for 50 to 90 seconds at 100° C. When the stretching ratio exceeds 4% or the heat treatment is performed for more than 90 seconds, processability is degraded, and when the heat treatment is performed for less than 50 seconds, heat resistance and strength become insufficient, which is not preferable.

The insulation member according to the present disclosure may have a fine pattern. The fine pattern may enlarge a surface area to increase a degree of adhesion between the insulation member, the jelly-roll, and a top cap assembly, and improve insulation properties of the insulation member.

Here, a shape of the pattern is not particularly limited, but preferably has any one of a mesh shape, a lamellar shape, an embo shape, a linear shape, a circular shape, an elliptical shape, a polygonal shape, and a waveform shape.

Since the polypropylene may also be manufactured in a fiber shape, when the polypropylene is laminated to form a sheet, a rigid silicon master mold harder than the polypropylene is disposed on the sheet, and pressure is applied to the silicon master mold, an etched shape of the silicon master mold is directly transferred to a surface of the laminated polypropylene sheet. Through such a transfer technique, the fine pattern may be formed on the polypropylene sheet.

By manufacturing an insulation member with the polypropylene sheet having the fine pattern formed thereon as an outer surface, a polypropylene sheet having a large insulation portion surface area may be manufactured In the present disclosure, the silicon master mold used to form the pattern on the polypropylene sheet may use a silicon master mold manufactured according to any known technique. For example, a desired shape may be transferred to a photoresist by disposing a photomask of the desired shape on a silicon wafer coated with the photoresist and irradiating with ultraviolet light. Thereafter, the silicon may be etched according to the desired shape to manufacture the silicon master mold.

According to one embodiment of the present disclosure, there is provided a secondary battery having the insulation member including the polypropylene.

A cylindrical secondary battery according to one embodiment of the present disclosure includes a cylindrical can configured to accommodate an electrode assembly together with an electrolyte, and a cap assembly configured to seal an open end of the cylindrical can.

In the cylindrical secondary battery, the cylindrical can is made of a lightweight conductive metal material such as aluminum or an aluminum alloy, and has a cylindrical structure having an open portion with an open upper end thereof and a sealed bottom portion facing to the open portion. The electrode assembly and the electrolyte are embedded in an inner space of the cylindrical can.

The electrolyte filling the cylindrical can is used to move lithium ions generated by an electrochemical reaction of an electrode plate during charging and discharging of the secondary battery, and may include a non-aqueous organic electrolyte, which is a mixture of a lithium salt and high purity organic solvents, or a polymer using a polymer electrolyte.

The electrode assembly accommodated in the cylindrical may have a laminate structure including two electrode plates having a wide plate shape with different polarities from each other and in a form of a roll, and a separator interposed between the electrode plates or disposed to the left or right of one of the electrode plates to isolate the electrode plates from each other. Further, the laminate structure may be wound in a form of a jelly-roll. Of course, the laminate structure may also have a structure in which a positive electrode plate and a negative electrode plate of a predetermined size are laminated with a separator interposed therebetween. Each of the two electrode plates has a structure in which an active material slurry is applied to a metal foil or metal mesh type current collector including aluminum or copper. The slurry is typically formed by stirring a granular active material, an auxiliary conductor, a binder and a plasticizer in a state in which a solvent has been added thereto. The solvent is removed in a subsequent process. At a starting point and an end point of the current collector in a direction in which the electrode plate is wound, there may be an uncoated portion on which the slurry is not applied. A pair of leads corresponding to each of the electrode plates is attached to the uncoated portion. A first lead attached to an upper end of the electrode assembly is electrically connected to the cap assembly and a second lead attached to a lower end of the electrode assembly is connected to a bottom of the cylindrical can. Of course, both the first lead and the second lead may be led in a direction toward the cap assembly. It is preferable that the electrode assembly is disposed on a first insulation plate installed on the bottom portion of the cylindrical can and a second insulation plate is disposed on the upper end of the electrode assembly. The first insulation plate insulates between the electrode assembly and the bottom portion of the cylindrical can, and the second insulation plate insulates between the electrode assembly and the cap assembly.

Meanwhile, a center pin may be inserted in a center of the cylindrical can to prevent the electrode assembly wound in a form of a jelly-roll from being unwound and to perform a role as a movement path for gas inside the secondary battery. A beading portion formed by press-bending from the outside toward the inside is provided on an upper portion of the cylindrical can, that is, an upper portion of the upper end of the electrode assembly, so that an upward/downward movement of the electrode assembly may be prevented.

Further, in the cylindrical secondary battery, the cap assembly is assembled to the open portion of the cylindrical can in a sealed state by disposing a gasket, disposed at the open end of the cylindrical can to seal the cylindrical can, and includes: a top cap forming a positive electrode terminal; a current interrupt device (CID) electrically connected to the electrode assembly; and a safety vent which is connected to the CID through a connection portion to electrically connect the CID and the top cap, and configured to cut off a current flow by breaking the connection portion when gas is generated in the cylindrical can due to an abnormal current.

In the cap assembly, the top cap includes electrode terminals formed to be electrically connected to the outside.

Further, in the cap assembly, the safety vent is bent to surround an outer peripheral surface of the top cap, and protrudes convexly from the center to be welded to the CID.

The safety vent functions to cut off a current or exhaust gas when a pressure inside the battery rises, and may be made of a metal material. A thickness of the safety vent may vary depending on the material and structure thereof, and is not particularly limited as long as the safety vent can discharge gas while rupturing occurs when a predetermined high pressure is generated inside the battery, and for example, may be in a range of from 0.2 to 0.6 mm.

Further, a thickness of a top cap portion, which is brought into contact with the safety vent, is not particularly limited as long as the thickness is within a range which can protect various components of the cap assembly from an externally applied pressure, and for example, may be in a range of from 0.3 to 0.5 mm. When the thickness of the top cap portion is too small, a predetermined mechanical rigidity is hardly exhibited. On the other hand, when the thickness is too great, a capacity of the battery may be reduced in comparison to the same standard due to increased size and weight.

Further, in the cap assembly, the CID may be deformed together with the safety vent by an internal pressure of the secondary battery, and may be divided into a CID gasket and a CID filter.

Further, in the cylindrical secondary battery, the cap assembly may include a positive temperature coefficient (PTC) element between the safety vent and the top cap. Specifically, the cap assembly may include the top cap configured to seal the open end of the cylindrical can and disposed to be brought into contact with a protruding portion of the gasket, the PTC element disposed to be brought into contact with the top cap, and the safety vent which is electrically connected to the electrode assembly and disposed so that one surface thereof is brought into contact with the PTC element and a part of the other surface thereof is brought into contact with a concavo-convex portion of the gasket.

The PTC element greatly increases a resistance of the battery and serves to cut off a current when a temperature inside the battery rises, and a thickness of the PTC element may also vary depending on the material and structure thereof, and for example, may be in a range of from 0.2 mm to 0.4 mm.

When the thickness of the PTC element is greater than 0.4 mm, an internal resistance and a size of the battery may be increased such that a capacity of the battery may be reduced in comparison to the same standard. On the other hand, when the thickness of the PTC element is smaller than 0.2 mm, a desired current blocking effect is hardly exhibited at a high temperature and the PTC element may be destroyed even by a weak external impact. Accordingly, the thickness of the PTC element may be appropriately determined within the above described thickness range in consideration of a combination of the above described points. A thickness of a top cap portion, which is brought into contact with the PTC element, is not particularly limited as long as the thickness is within a range which can protect various components of the cap assembly from an externally applied pressure, and for example, may be in a range of from 0.3 to 0.5 mm. When the thickness of the top cap portion is too small, mechanical rigidity is hardly exhibited. On the other hand, when the thickness is too great, a capacity of the battery may be reduced in comparison to the same standard due to increased size and weight.

The cylindrical secondary battery including the cap assembly having the top cap, the PTC element, and the safety vent may be used as a power source for mobile phones, notebook computers, or the like, which stably supplies a constant output. However, a lithium secondary battery having a structure including the top cap, the PTC element, and the safety vent may have difficulty in providing instantaneous high output, and may have some difficulties in providing a uniform output because a contact surface resistance changes when an external impact such as vibration is applied. Specifically, the PTC element generally has an electric resistance of about 7 to 32 mΩ even at room temperature, and furthermore, causes the resistance to rise sharply when the temperature rises, which serves as a major factor impeding provision of the instantaneous high output. Further, the output may not be uniform because changes in resistance at contact surfaces of the top cap, the PTC element, and the safety vent become very great when an external impact such as vibration is applied.

Hereinafter, the present disclosure will be described in more detail through examples. However, examples and experimental examples described below are for exemplifying the present disclosure, and the scope of the present disclosure is not limited thereto.

EXAMPLES 1 TO 4

A top cap and a cylindrical case were manufactured using SPCE (cold rolled carbon steel sheet) plated with Ni, a cylindrical case electrode assembly was mounted, and then an insulation member made of a polymer resin shown in Table 1 was mounted. A crimping portion was formed by performing a beading process on the cylindrical case at a portion corresponding to an upper end portion of the electrode assembly, and then a current interrupt device (CID) was mounted on the crimping portion and a gasket was mounted at an edge portion of the CID. Thereafter, the CID was bonded to a safety vent by laser welding. Then, a PTC element and the top cap were mounted, an upper end of a can was bent inward, and clamping and pressing processes were performed to manufacture a cylindrical secondary battery of 18650 standard (18 mm in diameter, 65 mm in length).

EXAMPLES 5 TO 8

A cylindrical secondary battery was manufactured in the same manner as in Example 1, except that an insulation member having a surface on which a fine pattern was formed was used.

COMPARATIVE EXAMPLES 1 TO 4

A cylindrical secondary battery was manufactured in the same manner as in Example 1, except that an insulation member of a polymer resin having characteristics as shown in Table 1 below was used.

EXPERIMENTAL EXAMPLE

The manufactured secondary batteries were compressed at 675 kgf, and whether the batteries were short-circuited is shown in Table 1 below. Further, the manufactured secondary batteries were compressed at 1350 kgf, and whether the batteries were short-circuited is shown in Table 1 below.

TABLE 1

| | Insulation | | Short-Circuited or Not | |
| --- | --- | --- | --- | --- |
| | Member Material | Pattern Shape | 675 kgf | 1350 kgf |
| Example 1 | PP | — | X | X |
| Example 2 | PP | — | X | X |
| Example 3 | PP | — | X | X |
| Example 4 | PP | — | X | X |
| Example 5 | PP | Mesh | X | X |
| Example 6 | PP | Mesh | X | X |
| Example 7 | PP | Embo | X | X |
| Example 8 | PP | Embo | X | X |
| Comparative Example 1 | Nonwoven (PE) | — | ○ | ○ |
| Comparative | Nonwoven (PE) | — | ○ | ○ |

TABLE 1-continued

| | Insulation Member Material | Pattern Shape | Short-Circuited or Not | |
| --- | --- | --- | --- | --- |
| | | | 675 kgf | 1350 kgf |
| Example 2 | | | | |
| Comparative Example 3 | Nonwoven (PE) | — | X | ○ |
| Comparative Example 4 | Nonwoven (PE) | — | X | ○ |

Physical properties of the polymer resin used in preparation of the insulation members of above examples and comparative examples are shown in Table 2 below.

TABLE 2

| | Intrinsic Viscosity | Mw/Mn | Tensile Strength (MPa, 100° C.) | Flexural Modulus (MPa, 100 ° C.) |
| --- | --- | --- | --- | --- |
| Example 1 | 0.81 | 1.97 | 26 | 1577 |
| Example 2 | 0.87 | 2.05 | 25 | 1569 |
| Example 3 | 0.93 | 2.04 | 27 | 1599 |
| Example 4 | 0.90 | 1.98 | 25 | 1611 |
| Example 5 | 0.83 | 1.91 | 24 | 1593 |
| Example 6 | 0.92 | 2.03 | 26 | 1587 |
| Example 7 | 0.88 | 2.01 | 26 | 1609 |
| Example 8 | 0.95 | 1.99 | 25 | 1614 |
| Comparative Example 1 | 0.33 | 4.11 | 17 | 1261 |
| Comparative Example 2 | 0.42 | 4.23 | 16 | 1272 |
| Comparative Example 3 | 0.37 | 4.18 | 17 | 1313 |
| Comparative Example 4 | 0.41 | 4.27 | 18 | 1307 |

As experimental results, in the secondary batteries of Examples 1 to 8 including the insulation member satisfying requirements of physical properties presented in the present disclosure, a short circuit did not occur even at 1350 kgf as a result of a compression test.

However, a short circuit occurred at both 675 and 1350 kgf in the case of Comparative Examples 1 and 2 which did not satisfy the above-described physical properties, and a short circuit did not occur at 675 kgf but a short circuit occurred at 1350 kgf in the case of Comparative Examples 3 and 4.

As described above, while the present disclosure has been described with reference to specific embodiments and drawings, the present disclosure is not limited thereto. It is clear by those skilled in the art that various modifications and alterations may be made without departing from the spirit and scope of the present disclosure and equivalents of the appended claims.

The invention claimed is:

1. An insulation member disposed on an upper end of a jelly-roll in a secondary battery in which the jelly-roll having a positive electrode, a negative electrode and a separator disposed between the positive electrode and the negative electrode is mounted in a cylindrical battery case,
    wherein the insulation member is a plate type structure made of polypropylene and
    the polypropylene has a tensile strength of from 20 to 30 MPa, a flexural modulus of from 1500 to 1650 MPa at 100° C., an intrinsic viscosity of from 0.6 to 1.2 dl/g, and an Mw/Mn value of from 1.5 to 2.5.

2. The insulation member of claim 1, wherein the insulation member has a fine pattern.

3. The insulation member of claim 2, wherein a shape of the fine pattern is a mesh shape, a lamellar shape, an embo shape, a linear shape, a circular shape, an elliptical shape, a polygonal shape, or a waveform shape.

4. The insulation member of claim 2, wherein the fine pattern is formed by printing a pattern using a silicon master mold.

5. A cylindrical secondary battery having the insulation member according to claim 1.

* * * * *